United States Patent
Mino et al.

(10) Patent No.: US 8,652,303 B2
(45) Date of Patent: Feb. 18, 2014

(54) METHOD FOR DESALINATING SALTWATER WITH DESALINATION DEVICE

(75) Inventors: Norihisa Mino, Osaka (JP); Daisuke Ueda, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/372,098

(22) Filed: Feb. 13, 2012

(65) Prior Publication Data

US 2012/0138448 A1    Jun. 7, 2012

Related U.S. Application Data

(63) Continuation of application No. PCT/JP2011/004715, filed on Aug. 25, 2011.

(30) Foreign Application Priority Data

Nov. 5, 2010    (JP) .................................. 2010-248072

(51) Int. Cl.
 *B01D 3/00*    (2006.01)
 *C02F 1/14*    (2006.01)

(52) U.S. Cl.
 USPC .................. 203/10; 62/85; 62/119; 159/903; 159/DIG. 21; 202/234; 203/100; 203/DIG. 1; 203/DIG. 17; 210/767; 210/774

(58) Field of Classification Search
 USPC ............. 159/903, DIG. 21; 202/234; 203/10, 203/100, DIG. 1, DIG. 17; 210/767, 774; 62/85, 119
 See application file for complete search history.

(56) References Cited

U.S. PATENT DOCUMENTS

| | | | | |
|---|---|---|---|---|
| 2,445,350 | A | * | 7/1948 | Ginginis ........................ 202/172 |
| 3,878,054 | A | * | 4/1975 | Rodgers ......................... 203/11 |
| 4,698,135 | A | * | 10/1987 | Raab ............................ 202/234 |
| 5,270,080 | A | | 12/1993 | Mino et al. |
| 5,628,879 | A | * | 5/1997 | Woodruff ..................... 202/234 |
| 7,470,349 | B1 | * | 12/2008 | Miller .......................... 202/182 |

(Continued)

FOREIGN PATENT DOCUMENTS

| | | |
|---|---|---|
| JP | 60-13206 | 1/1985 |
| JP | 04-256466 | 9/1992 |
| JP | 05-192567 | 8/1993 |

OTHER PUBLICATIONS

International Search Report issued in International Patent Application No. PCT/JP2011/004715 dated Nov. 22, 2011.

*Primary Examiner* — Virginia Manoharan
(74) *Attorney, Agent, or Firm* — McDermott Will & Emery LLP

(57) ABSTRACT

A desalination device includes a vessel, a breathable sheet, a water-repellent particle layer and a tank layer. The tank layer is positioned at the lower portion inside the vessel and the breathable sheet is interposed between the water-repellent particle layer and the tank layer. The breathable sheet includes a through-hole, the water-repellent particle layer is composed of a plurality of water-repellent particles, and the surface of the respective water-repellent particles includes a water-repellent film. The saltwater is desalted by a step of pouring saltwater into the vessel to dispose the saltwater on the surface of the water-repellent particle layer, a step of heating the saltwater to evaporate the saltwater into vapor; and a step of liquefying the vapor to obtain fresh water in the tank layer.

13 Claims, 3 Drawing Sheets

(56) References Cited

U.S. PATENT DOCUMENTS

2003/0062320 A1* 4/2003 Dobler et al. ............... 210/748
2010/0071388 A1* 3/2010 Koshiyama et al. .............. 62/85
2010/0212719 A1* 8/2010 Stolum ........................ 136/246

* cited by examiner

METHOD FOR DESALINATING SALTWATER WITH DESALINATION DEVICE

This is a continuation of International Application No. PCT/JP2011/004715, with an international filing date of Aug. 25, 2011, which claims priority of Japanese Patent Application No. 2010-248072, filed on Nov. 5, 2010, the contents of which are hereby incorporated by reference.

TECHNICAL FIELD

The present invention relates to a method for desalinating saltwater with a desalination device.

BACKGROUND ART

Patent Document 1 discloses a sand filter to filter seawater and remove a solid in the seawater.

Patent Document 2 discloses to provide water repellency to a filter medium consisting of porous particles (Particularly, in paragraph [0017]).

A solid contained in seawater may be removed with the sand filter. However, ions dissolved in seawater fail to be removed. Accordingly, the sand filter is not capable of desalinating seawater.

CITATION LIST

Patent Documents

[Patent Document 1] Japanese Utility Model Unexamined Publication No. S60-013206

[Patent Document 2] Japanese Patent Unexamined Publication No. H05-192567

SUMMARY OF INVENTION

An object of the present invention is to provide a method for desalinating saltwater with a desalination device.

The desalination device comprises inside a vessel, a breathable sheet, a water-repellent particle layer and a tank layer. The tank layer is positioned at the lower portion inside the vessel and the breathable sheet is interposed between the water-repellent particle layer and the tank layer. The breathable sheet comprises a through-hole, the water-repellent particle layer is composed of a plurality of water-repellent particles, and the surface of the respective water-repellent particles comprises a water-repellent film.

The saltwater is desalted by a step of pouring saltwater into the vessel to dispose the saltwater on the surface of the water-repellent particle layer, a step of heating the saltwater to evaporate the saltwater into vapor; and a step of liquefying the vapor to obtain fresh water in the tank layer.

DESCRIPTION OF EMBODIMENTS

Figure 1:
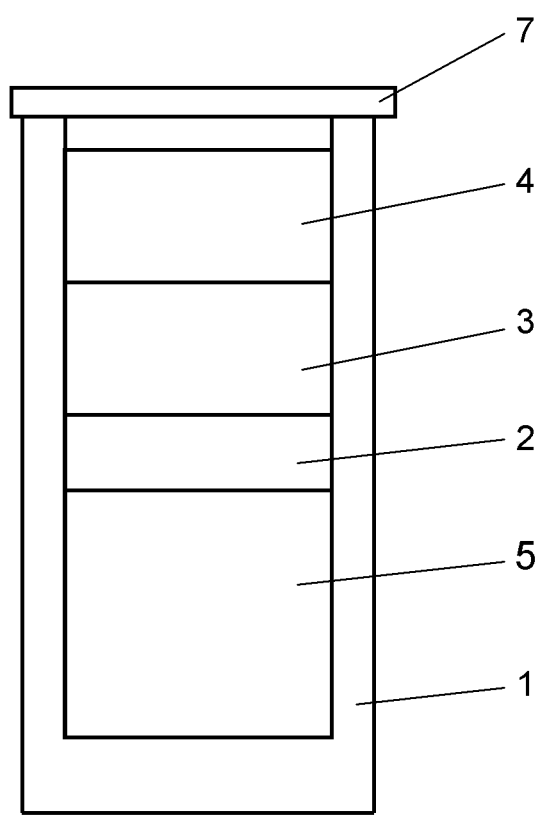
FIG. 1 shows a desalination device according to the present invention.
Figure 2:
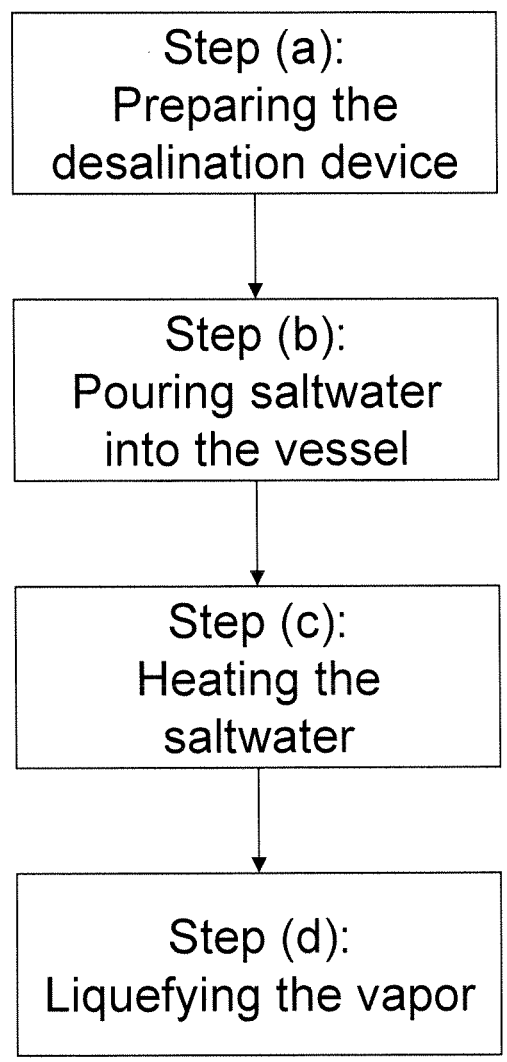
FIG. 2 shows a desalination method according to the present invention.

An embodiment of the present invention is described below with reference to the drawing.

(Definitions of Terms)

The term "Filtration" means that the liquid containing a solid passes through a porous material to remove the solid. The solid fails to be dissolved in the liquid.

The term "Desalination" means to obtain fresh water from seawater in which impurities such as an ion are dissolved. In other words, it means to remove salt from seawater. The salt is dissolved in the seawater.

The term "Filtration" is discriminated strictly from the term "Desalination" herein.

The term "Filtration" must not be used to mean to remove impurities dissolved in a liquid.

The term "Desalination" must not be used to mean to remove a solid undissolved in a liquid.

(Embodiment 1)

(Step (a))

First, a desalination device is prepared. FIG. 1 shows the desalination device according to the present invention. The desalination device comprises a vessel 1, a breathable sheet 2, a water-repellent particle layer 3, and a tank layer 5. The breathable sheet 2, the water-repellent particle layer 3, and the tank layer 5 are provided inside the vessel 1.

The tank layer 5 is positioned at the lower portion inside the vessel 1. Specifically, the tank layer 5 is interposed between the bottom surface of the vessel 1 and the breathable sheet 2. The tank layer 5 is usually filled with air. A preferable height of the tank layer 5 is not less than 5 cm and not more than 15 cm.

Figure 3:
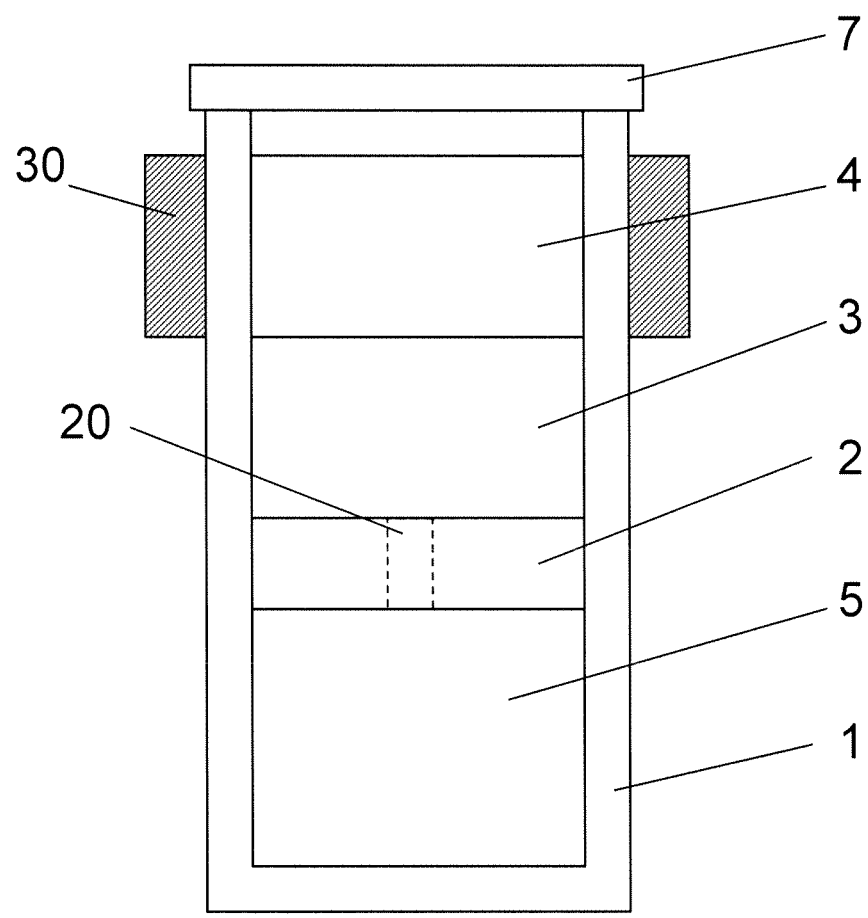
FIG. 3 shows a desalination device according to the present invention.

The breathable sheet 2 comprises a through-hole 20 as shown in FIG. 3. A preferable shape of the through-hole is circular. An example of the cross-sectional area of the through-hole is not less than 3.14 mm$^2$ and not more than 78.5 mm$^2$. When the diameter is less than 1 mm, it may be difficult for gas to pass through the breathable sheet 2. On the contrary, when the diameter is more than 5 mm, the particles constituting the water-repellent particle layer 3 may fall down into the tank layer 5 through the through-hole. The number of the through-hole(s) 20 is not limited.

A preferable material of the breathable sheet 2 is resin. An example of the resin is polyvinyl chloride. A preferable thickness of the breathable sheet 2 is not less than 0.5 mm and not more than 5 mm.

The periphery of the breathable sheet 2 is adhered to the internal surface of the vessel 1 with adhesive. In other words, the periphery of the breathable sheet 2 is in contact with the internal surface of the vessel 1.

The water-repellent particle layer 3 is provided on the upper surface of the breathable sheet 2. The water-repellent particle layer 3 is composed of a plurality of water-repellent particles. The plurality of water-repellent particles are clustered together to form the water-repellent particle layer 3. Specifically, the surface of one water-repellent particle is in contact with the surfaces of other plural water-repellent particles.

Each of the water-repellent particles has a particle and a water-repellent film. It is preferred that the particle is a sand particle.

The water-repellent film coats the surface of the particle. It is preferred that the water-repellent film comprises a fluorocarbon group represented by the chemical formula: —$(CF_2)_n$—. n is a natural number. Preferably, n is not less than 2 and not more than 20.

It is preferred that the water-repellent film is bound to the particle by a covalent bond. The following chemical formula (I) represents a preferable water-repellent film.

[Chemical formula 1]

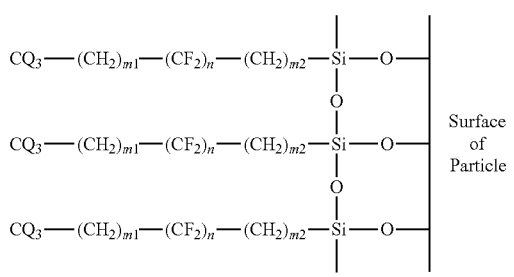

Q represents hydrogen or fluorine.

m1 and m2 represent zero or a natural number of not less than one, independently.

n is not less than 2 and not more than 20.

A preferred thickness of the water-repellent particle layer 3 is described later.

An example of a method for producing the water-repellent particles is described below.

First, the surfactant represented by the chemical formula: $CX_3-(CH_2)_{m1}-(CF_2)_n-(CH_2)_{m2}-SiX_3$ is dissolved in a non-aqueous solvent to prepare a surfactant solution. X is halogen, preferably, chlorine.

Next, a plurality of particles are immersed in the surfactant solution in dry atmosphere to obtain a plurality of water-repellent particles.

For more detail, see U.S. Pat. No. 5,270,080, which is incorporated herein by reference and corresponds to Japanese Patent Publication No. H07-063670B.

The resulted plurality of water-repellent particles are fed into the vessel 1 comprising the breathable sheet 2. Thus, the plurality of water-repellent particles are stacked on the breathable sheet 2 to form the water-repellent particle layer 3.

(Step (b))

In the step (b), seawater is poured into the vessel 1 to form a seawater layer 4 on the upper surface of the water-repellent particle layer 3. Because of the water-repellency of the water-repellent particle layer 3, the seawater which has been poured fails to run down into the tank layer 5. In other words, the seawater which has been poured is stacked on the upper surface of the water-repellent particle 3 and maintained as the seawater layer 4.

A preferable thickness of the water-repellent particle layer 3 is not less than 5 cm and not more than 15 cm. If the water-repellent particle layer 3 is too thin, seawater which has been poured may run down into the tank layer 5. On the contrary, if the water-repellent particle layer 3 is too thick, the breathable sheet 2 may be broken and come away from the internal surface of the vessel 1 due to too heavy weight of the water-repellent particle layer 3.

(Step (c))

In the step (c), the seawater of the seawater layer 4 is heated. This causes the water contained in the seawater to be evaporated. Thus, the water contained in the seawater becomes gas, namely, vapor.

It is preferred that sunlight heats the seawater of the seawater layer 4. It is also preferred that a heater heats the seawater of the seawater layer 4.

A heated solid material may be supplied into the seawater layer 4 to heat the seawater. Needless to say, the solid material is required to be insoluble in the seawater. A preferable example of the solid material is a stone.

(Step (d))

The vapor moves not only upwardly but also downwardly. The vapor which moves downwardly passes through the water-repellent particle layer 3. To be exact, the vapor passes through interspaces formed between the plurality of the water-repellent particles which constitute the water-repellent particle layer 3. Thus, the vapor reaches the upper surface of the breathable sheet 2.

Furthermore, the vapor passes through the through-hole which the breathable sheet 2 comprises to reach inside the tank layer 5. In the tank layer 5, the vapor is liquefied to be liquid water. Preferably, the vapor is cooled to be liquid water in the tank layer 5. The liquid water fails to contain impurities contained in seawater. An example of the impurities is an ion. That is, the liquid water is fresh water.

Thus, the fresh water is obtained in the tank layer 5.

Alternatively, the vapor which has passed through the interspaces in the water-repellent particle layer 3 is liquefied at the lower portion of the water-repellent particle layer 3 or the upper surface of the breathable sheet 2 to be liquid water. The liquid water passes through the through-hole which the breathable sheet 2 comprises to drip down into the tank layer 5. The liquid water is also fresh water.

Thus, the fresh water is obtained in the tank layer 5.

Preferably, the vessel 1 comprises a lid 7. The lid 7 fails to allow the vapor which moves upwardly to escape from the vessel 1. If the sunlight heats the seawater layer 4, it is preferred that the lid 7 is transparent.

The tank layer 5 may be cooled optionally.

The following examples describe the present invention in more detail.

Example 1

(Preparation of Vessel 1)

First, a vessel 1 was prepared. The vessel 1 was a rectangular parallelepiped with a width of 10 cm, a height of 15 cm, and a depth of 10 cm. The material of the vessel 1 was polyvinyl chloride.

(Installation of Breathable Sheet 2)

Next, a breathable layer 2 was installed in the vessel 1. The breathable sheet 2 can be specified as a breathable layer 2. The breathable layer 2 was a thin plate made from polyvinyl chloride with a thickness of 1 mm. Some holes were beforehand formed in the thin plate with a drill. Each of the holes had a diameter of approximately 3 mm. The thin plate was adhered in the inside of the vessel 1 with adhesive (available from CEMEDINE CO., LTD., trade name: adhesive for rainwater pipe) to form the breathable layer 2 and a tank 5. The distance between the bottom of the vessel 1 and the breathable layer 2 was 8 cm.

(Preparation of Water-Repellent Particles)

Water-repellent particles were prepared in accordance with the procedure disclosed in U.S. Pat. No. 5,270,080, which is incorporated herein.

Sand with trade name of "Toyoura suna" was purchased from Toyoura Keiseki Kogyo K.K. The sand was washed with acetone to remove impurities on the surface thereof. Subsequently, the sand was stored in dry nitrogen atmosphere.

Next, a fluorocarbon silane surfactant with the chemical formula: $CF_3(CF_2)_7(CH_2)_2SiCl_3$ (5 ml) was dissolved in a non-aqueous solvent (available from Sumitomo 3M Limited, trade name: HFE7200, 500 mL) to prepare a surfactant solution. The sand was immersed in the surfactant solution in dry atmosphere to prepare water-repellent particles.

The water-repellent particles were supplied into the vessel 1 to form a water-repellent particle layer 3 with a thickness of 10 cm. The present inventor made sure that the water-repellent particles failed to pass through the holes formed in the breathable layer 2.

(Pour of Saltwater)

Sodium chloride (available form KANTO CHEMICAL CO., INC.) was dissolved in tap water to prepare simulated seawater with a salinity concentration of 3.5%. The simulated seawater was poured into the vessel 1. The simulated seawater was kept on the top surface of the water-repellent particle layer 3 to form a seawater layer 4 with a thickness of 3 cm. The simulated seawater failed to dribble downwardly from the bottom of the water-repellent particle layer 3. Finally, a lid 7 was put onto the vessel 1.

(Desalination of Saltwater)

A heater 30 (available from O&M Heater Corporation, trade name: silicone rubber heater) was wound on the external surface of the vessel 1 so that the heater 30 surrounds the seawater layer 4, as shown in FIG. 3. A thermometer was provided in the seawater layer 4. The heater was turned on to warm the simulated seawater to 67 degree Celsius. Subsequently, the vessel 1 was left for 11 hours. Because neither a heating device nor a cooling device was provided on the tank 5, the temperature in the tank 5 remained at room temperature (22 degree Celsius), presumably.

After 11 hours, water accumulated in the tank 5. The salinity concentration of the water accumulated in the tank 5 was measured with a salinity concentration meter (available from AS ONE Corporation, trade name: pocket salt meter). The result was 0.0%. That is, the water accumulated in the tank 5 contained no sodium chloride.

The present inventor drank the water accumulated in the tank 5. No salty taste was felt.

Example 2

In place of the heater, a lamp for heating (available from IWASAKI ELECTRIC company, trade name: AI IR Lamp) was employed. The simulated seawater was warmed to 43 degree Celsius. Furthermore, the external surface of the tank layer 5 was surrounded with a refrigerant.

The rate of water accumulation in the tank layer 5 in the present example 2 was more rapid than that of the example 1.

The salinity concentration of the water accumulated in the tank 5 was 0.0%. Also in the present example 2, the present inventor drank the water accumulated in the tank 5. No salty taste was felt.

Comparative Example 1

An experiment similar to that of the example 1 was performed except that sand with trade name of "Toyoura Suna" was employed in place of the water-repellent particles. Needless to say, the sand failed to have water-repellency.

The salinity concentration of the water which fell down into the tank 5 was 3.5%. Also in the present comparative example 1, the present inventor drank the water in the tank 5. Salty taste was felt.

INDUSTRIAL APPLICABILITY

The present invention achieves desalination of seawater. Instead of seawater, saltwater may be used.

REFERENCE MARKS IN THE DRAWINGS

1: Vessel
2: Breathable sheet (Breathable layer)
3: Water-repellent particle layer
4: Seawater layer
5: Tank layer
7: Lid

The invention claimed is:

1. A method for desalinating saltwater with a desalination device, the method comprising:
   a step (a) of preparing the desalination device comprising:
      a vessel,
      a breathable sheet,
      a water-repellent particle layer, and
      a tank layer, wherein
         the breathable sheet, the water-repellent particle layer, and the tank layer are provided inside the vessel,
         the tank layer is positioned at a lower portion inside the vessel,
         the breathable sheet is interposed between the water-repellent particle layer and the tank layer,
         the breathable sheet comprises a through-hole,
         the water-repellent particle layer is composed of a plurality of water-repellent particles,
         a surface of each of the water-repellent particles comprises a water-repellent film, and
         the plurality of water-repellent particles are clustered together;
   a step (b) of pouring saltwater into the vessel to dispose the saltwater on the surface of the water-repellent particle layer;
   a step (c) of heating the saltwater to evaporate the saltwater into vapor; and
   a step (d) of liquefying the vapor to obtain fresh water in the tank layer.

2. The method according to claim 1, wherein at least portion of the vapor moves toward the lower portion inside the vessel after the step (c) and before the step (d).

3. The method according to claim 1, wherein the vessel further comprises a lid.

4. The method according to claim 1, wherein the saltwater is heated by sunlight in the step (c).

5. The method according to claim 1, wherein the saltwater is heated by a heater in the step (c).

6. The method according to claim 1, wherein an external surface of the tank layer is cooled.

7. The method according to claim 6, wherein an external surface of the tank layer is cooled by a refrigerant.

8. The method according to claim 1, wherein the water-repellent film comprises a fluorocarbon group represented by the chemical formula: —$(CF_2)_n$—
   wherein n represents a natural number of not less than 2 and not more than 20.

9. The method according to claim 1, wherein the saltwater is seawater.

10. The method according to claim 1, wherein the plurality of water-repellent particles comprise sand particles.

11. The method according to claim 2, wherein the at least portion of the vapor passes through the water-repellent particle layer toward the lower portion inside the vessel after the step (c) and before the step (d).

12. The method according to claim 1, wherein the saltwater fails to pass through the water-repellent particle layer and the breathable sheet and to run down into the tank layer, after the step (b).

13. The method according to claim 1, wherein a thickness of the water-repellent particles layer is not less than 5 cm and not more than 15 cm.

* * * * *